UNITED STATES PATENT OFFICE.

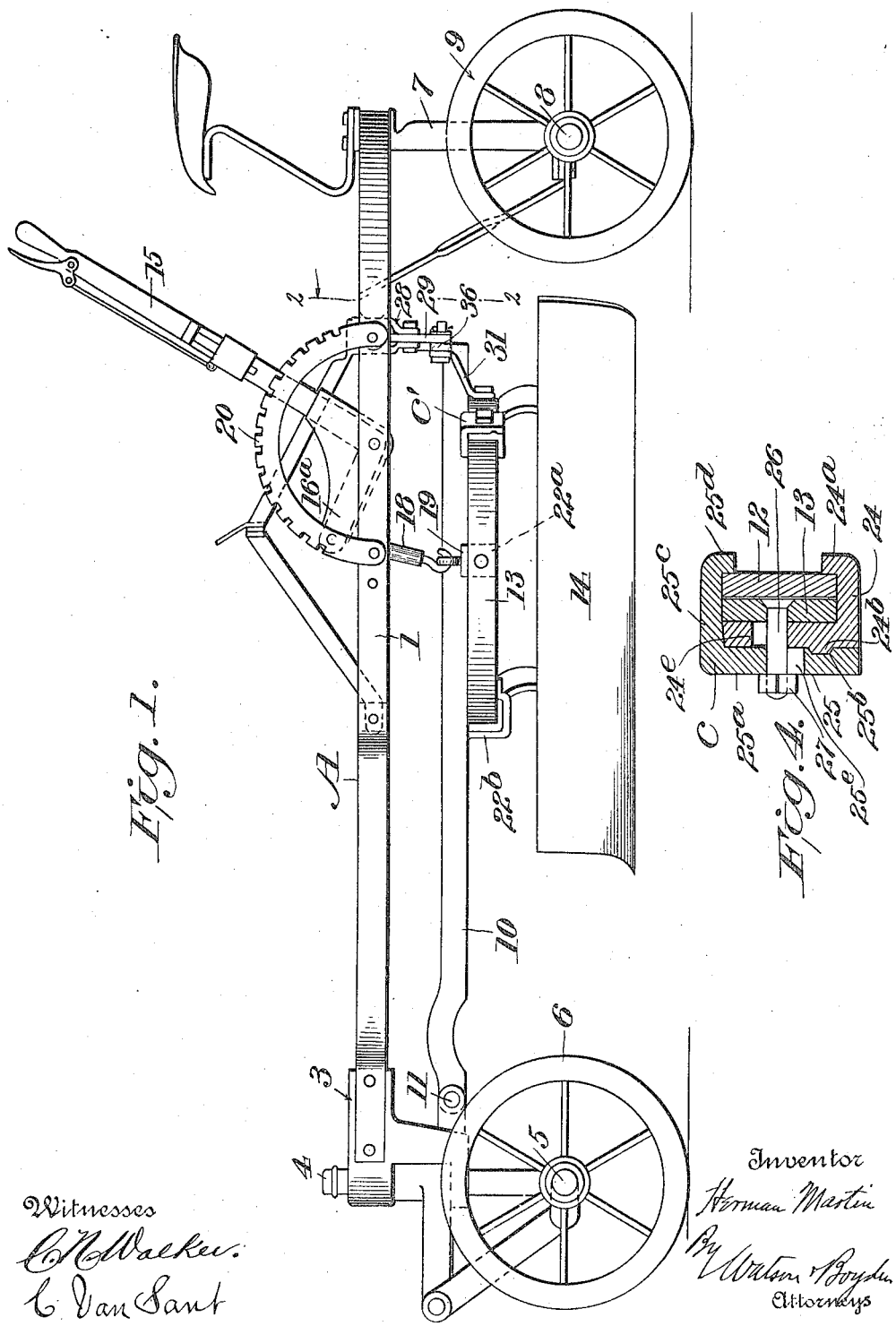

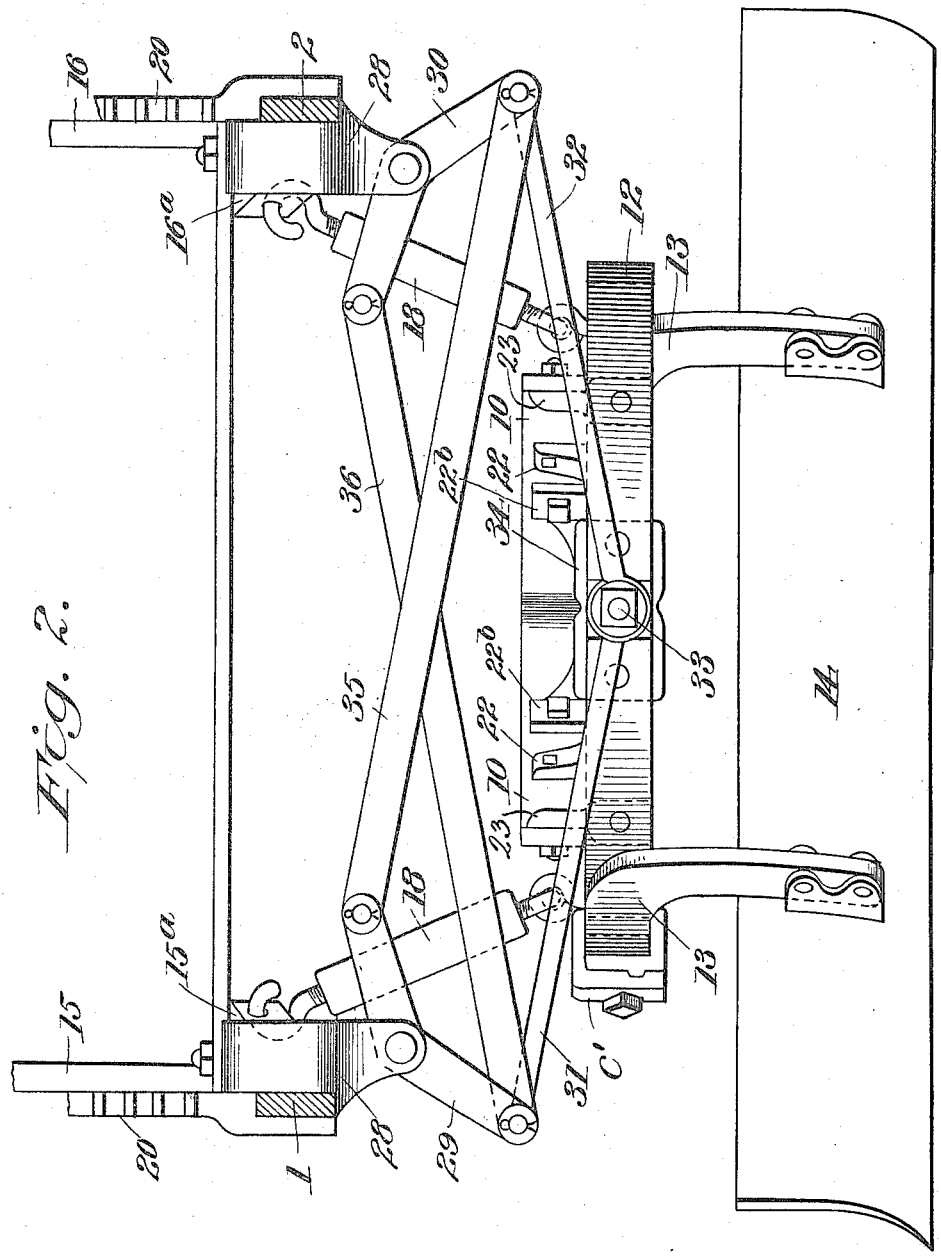

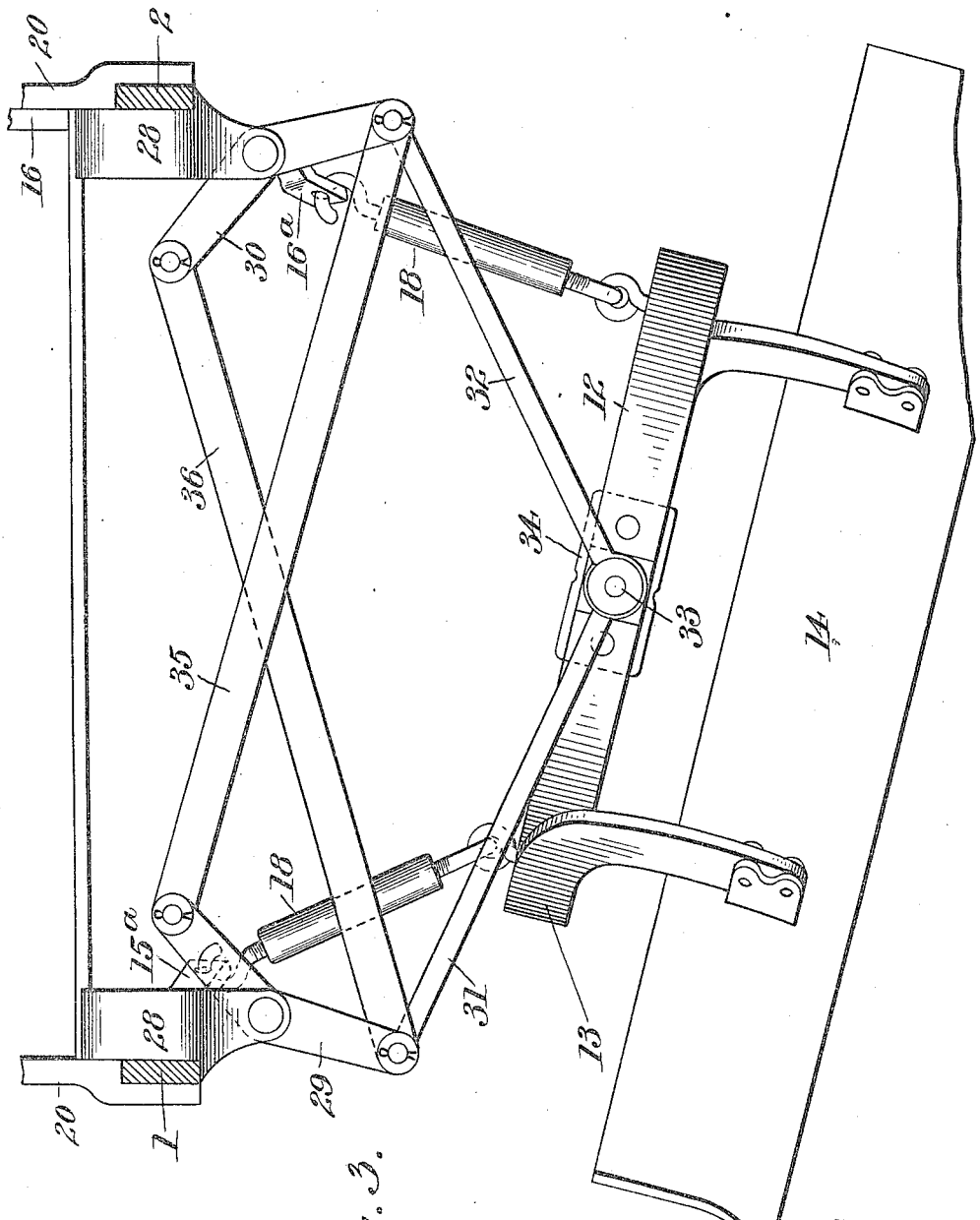

HERMAN MARTIN, OF LEONIA, NEW JERSEY, ASSIGNOR TO JULIAN SCHOLL COMPANY, OF NEW YORK, N. Y., A CORPORATION OF NEW JERSEY.

ROAD-SCRAPER.

1,193,167. Specification of Letters Patent. Patented Aug. 1, 1916.

Application filed April 2, 1915. Serial No. 18,758.

*To all whom it may concern:*

Be it known that I, HERMAN MARTIN, a citizen of the United States, residing at Leonia, in the county of Bergen and State of New Jersey, have invented certain new and useful Improvements in Road-Scrapers, of which the following is a specification.

This invention relates to improvements in wheeled road scrapers of the type in which the scraper blade is adjustably connected to an annular supporting member secured to a drag bar, which latter is hinged to the main frame and adjustable vertically by suitable means.

The invention comprises improved means for holding the drag bar, scraper blade, and associated parts, rigidly against lateral movement with respect to the main frame without interfering with the vertical adjustment of these parts, so that the drag bar which supports the blade will always be centered with respect to the frame, and the blade will follow the desired path over the roadway, scraping at any desired depth or angle without being thrust out of its path by the work.

The invention also comprises improved means for detachably and adjustably securing the member on the drag bar.

In the accompanying drawing, which illustrates my invention, Figure 1 is a side elevation of the same; Fig. 2 is a section on the line 2—2 of Fig. 1, showing the scraper blade in horizontal position; Fig. 3 is a similar sectional view showing the scraper blade tilted, the drag bar being omitted; and, Fig. 4 is a section through the supporting ring and half-ring and one of the clamps for connecting these members.

Referring to the drawings, A indicates the main frame of the machine, which comprises the side bars 1 and 2, the forward ends of which converge and are connected to a suitably formed casting 3, through which the king bolt 4 extends, the latter connecting the frame with the front axle 5, upon which the forward or steering wheels 6 are mounted. The rear end of the main frame is supported upon a bracket 7, which is secured to the rear axle 8, having the wheels 9 loosely mounted thereon. A forked drag bar 10 is hinged at 11 to the casting 3, and a supporting ring 12 is secured to the drag bar in the central part of the machine by means of suitable brackets several of which are shown at 22, and 23.

Adjustably secured to the supporting ring 12 is a half-ring 13, to which the scraper blade 14 is attached. For raising and lowering the scraper blade, and also for tilting the blade at an angle to the roadway, hand levers 15 and 16 are provided, these levers being pivoted between the side bars of the frame and brackets 17, secured thereto, said levers having at their lower ends short right angled arms 15$^a$ and 16$^a$, which are connected by turnbuckles 18 with a cross bar 19, extending diametrically across and secured to the supporting ring 12, as well as to the drag bar by the brackets 22 and 22$^a$. Notched segment plates 20 are secured to the side bars of the machine for locking the hand levers in any position of adjustment. It will be evident that by throwing the hand levers forward, the ring and scraper blade will be lowered, and by moving the levers backward, the ring and blade will be raised. Also, by moving one hand lever forward and the other backward, the ring and the blade will be tilted, as shown in Fig. 3. Further adjustments may, if desired, be made by means of the turnbuckles, which may be turned to lengthen or shorten the distances between the short arms of the hand levers and the cross bar 19. By the means described, the blade may be raised out of engagement with the ground, or lowered into engagement, and the depth of the cut made by the blade may be regulated.

In order to save time and labor in assembling the machine and taking it apart, I have provided means whereby the half-ring, carrying the scraper blade, may be detached from the supporting ring without disturbing any of the connections to the latter ring and without the necessity of adjusting or turning the half-ring around on the supporting ring. For this purpose, the half-ring is normally held in position upon the supporting ring by means of a hanger 22$^b$, depending from the drag bar and projecting under the supporting ring and half-ring, and by a pair of two-part clamps *c* and *c'*, which are bolted to the half-ring near its ends and adapted to slide upon the supporting ring. One of the clamps is shown in detail in Fig. 4. As shown in this view, the clamp is composed of two L-shaped parts 24 and 25, the former fitting against the outer side of the half-ring 13 and extending beneath the half-ring and the supporting ring, and having an upwardly turned part 24ª on the inner side of the supporting ring. This part of the clamp also has on its outer vertical side a rib 24ᵇ. The part 25 of the clamp has a vertical portion 25ª, which fits against the vertical portion of the part 24 of the clamp, and has a groove or recess 25ᵇ into which the rib 24ᵇ extends. The arm 25ᶜ of the part 25 extends over the top of the half-ring and the supporting ring, and has a downwardly turned end 25ᵈ, which engages the inner face of the supporting ring. A bolt 26 extends through the half-ring 13 and through slots 24ᵉ and 25ᵉ in the vertical portions of the clamp members, the head of the bolt being flush with the inner face of the half-ring, and a nut 27, threaded on to the bolt, bears against the member 25 and rigidly secures the clamping members together and to the half-ring. The slots are necessary, as the members must be canted in order to get them on and off. The engaging rib and recess for the clamping members prevent vertical movement of these parts relative to one another, and when the bolt is tightened, the parts are held rigidly together. It will be evident that by removing the bracket or hanger 22ᵇ, and by unbolting the two-part clamps c and c', the half-ring, with the scraper blade thereon, may be quickly detached from the supporting ring, and this may be done in any position of adjustment of the half-ring with respect to the supporting ring. Also, it will be evident, that the half-ring and blade may be as readily attached to the supporting ring by applying the bracket 22ᵇ and the detachable clamps.

When the scraper is in use and the blade is turned diagonally to the path of movement of the machine, there is a thrust upon the blade tending to move it laterally with respect to the frame. In order to resist this thrust and hold the scraper in place, without interfering with the desired vertical adjustments of the blade, I have provided a system of connecting devices between the main frame and the supporting ring which are best illustrated in Figs. 2 and 3. As shown in these views, brackets 28 are secured to the opposite sides of the main frame and in these brackets are mounted centrally pivoted levers 29 and 30, which are adapted to rock in a vertical plane transversely of the machine. Links 31 and 32 connect the lower arms of the levers 29 and 30, respectively, with a stud 33, projecting horizontally from a casting 34, which forms a splice for connecting the two ends of the supporting ring 12. The upper arm of the lever 29 is connected by a link 35 with the lower arm of the lever 30, and the upper arm of the lever 30 is connected by a link 36 with the lower arm of the lever 29. With this arrangement, it will be seen that when the supporting ring and the scraper blade are raised, by moving the hand levers backward, the links 31 and 32 will be moved endwise in opposite directions, rocking the levers 29 and 30 oppositely, but owing to the cross connections 35 and 36 between the levers, no lateral movement of the supporting ring or scraper blade, with respect to the frame, can take place. Thus, in Fig. 2, a thrust tending to move the scraper blade to the right and to rock the lever 30 would be resisted by the link 36, connected to said lever, which would prevent the link 31, connected to the supporting ring, from moving to the right. Also, the link 31 would be prevented from moving to the right by the link 35, connected to the opposite end of said lever and to that end of the lever 30 to which the link 32 is connected. Hence, it will be evident, that the drag bar and the scraper blade carried thereby may be adjusted vertically as desired, but the drag bar and scraper blade cannot be moved laterally with respect to the main frame by the thrust caused by the resistance of the work. It would be possible to attain the same result if one of the links 35 or 36 were omitted, but for greater strength, it is desirable to retain both links.

It is believed the operation will be clear from the foregoing description. The means described for preventing any lateral movement of the scraper blade while permitting free vertical adjustment thereof is important, and the features described for facilitating the assembling and removal of the scraper blade and half-ring from the supporting ring are also of importance in the way of saving time in assembling and taking the machine apart.

What I claim is:

1. In a road scraper, the combination with a wheel-supported frame, a drag-bar hinged at its forward end to the frame, a scraper-blade connected to the drag-bar and means for raising and lowering the drag bar, of means for preventing lateral motion of the drag bar and blade without interfering with the vertical movements of said parts comprising two members, pivoted to the opposite sides of the frame and adapted to rock in vertical planes transversely of the frame, one of said members being centrally pivoted, links connecting the drag-bar with said members at corresponding sides of the pivotal points of the latter, and a link connecting said members at opposite sides of their pivotal points.

2. In a road scraper, the combination with a wheel-supported frame, a drag bar hinged at its forward end to the frame, a scraper-blade connected to the drag bar and means for raising and lowering the drag bar, of means for preventing lateral motion of the drag bar and blade without interfering with the vertical movements of said parts comprising two centrally pivoted levers connected to the opposite sides of the frame and adapted to rock in vertical planes transversely of the frame, links connecting the drag bar with corresponding arms of the levers, and a link connecting opposite arms of the levers.

3. In a road scraper, the combination with a wheel-supported frame, a drag bar hinged at its forward end to the frame, a scraper-blade connected to the drag bar and means for raising and lowering the drag bar, of means for preventing lateral motion of the drag-bar and blade without interfering with the vertical movements of said parts comprising two centrally pivoted levers connected to the opposite sides of the frame and adapted to rock in vertical planes transversely of the frame, links connecting the drag-bar with corresponding arms of the levers, and a pair of links cross-connecting opposite arms of the levers.

In testimony whereof I have affixed my signature, in presence of two witnesses.

HERMAN MARTIN.

Witnesses:
EDWIN C. RICHTER,
JULIAN SCHOLL.

Copies of this patent may be obtained for five cents each, by addressing the "Commissioner of Patents, Washington, D. C."